United States Patent [19]

Rader

[11] 4,240,465
[45] Dec. 23, 1980

[54] MEDICATOR CONSTRUCTION
[75] Inventor: Helmut Rader, McLean, Va.
[73] Assignee: Interfarm Corporation, McLean, Va.
[21] Appl. No.: 37,217
[22] Filed: May 8, 1979
[51] Int. Cl.³ .......................... B67D 5/42; A01K 7/00
[52] U.S. Cl. .............................. 137/564.5; 222/386.5; 119/72
[58] Field of Search ..................... 137/564.5; 239/322, 239/327; 222/386.5; 128/173 R, 194; 119/72

[56] References Cited
U.S. PATENT DOCUMENTS

| | | | |
|---|---|---|---|
| 3,040,774 | 6/1962 | Stenberg | 137/564.5 |
| 3,084,712 | 4/1963 | Brown | 137/564.5 |
| 3,095,892 | 7/1963 | Laing et al. | 137/564.5 |
| 3,220,435 | 11/1965 | Ellingson | 137/564.5 |
| 3,929,128 | 12/1975 | Pekkarinen | 128/194 |
| 4,116,387 | 9/1978 | Kremer, Jr. et al. | 128/194 |
| 4,157,789 | 6/1979 | Laauwe | 239/327 |

OTHER PUBLICATIONS

*Medicator,* Monoflow International Inc., McLean, VA, 22101, USA.

Primary Examiner—Martin P. Schwadron
Assistant Examiner—A. Michael Chambers
Attorney, Agent, or Firm—Cushman, Darby & Cushman

[57] ABSTRACT

A method of constructing a medicator, and the medicator so produced. Housing top and bottom portions are formed by injection molding plastic. A water flow conduit is formed integrally on the side of both the top and bottom portions, and a medicant flow conduit is similarly integrally formed on the sides of the top and bottom portions. The medicant flow conduit and the water flow conduit interconnect in the integral raised portion of the housing top portion, and surface manifestations are provided on the top and/or bottom portions for receipt of a flexible bladder between them in liquid-tight sealing relationship. Fastener receiving structures are formed around the peripheries of both the top and bottom portions for receipt of fasteners to clamp the top and bottom portions together. A drain hole is provided on the bottom of the bottom housing portion, and an air bleed hole and a medicant entry hole are provided on the top.

10 Claims, 7 Drawing Figures

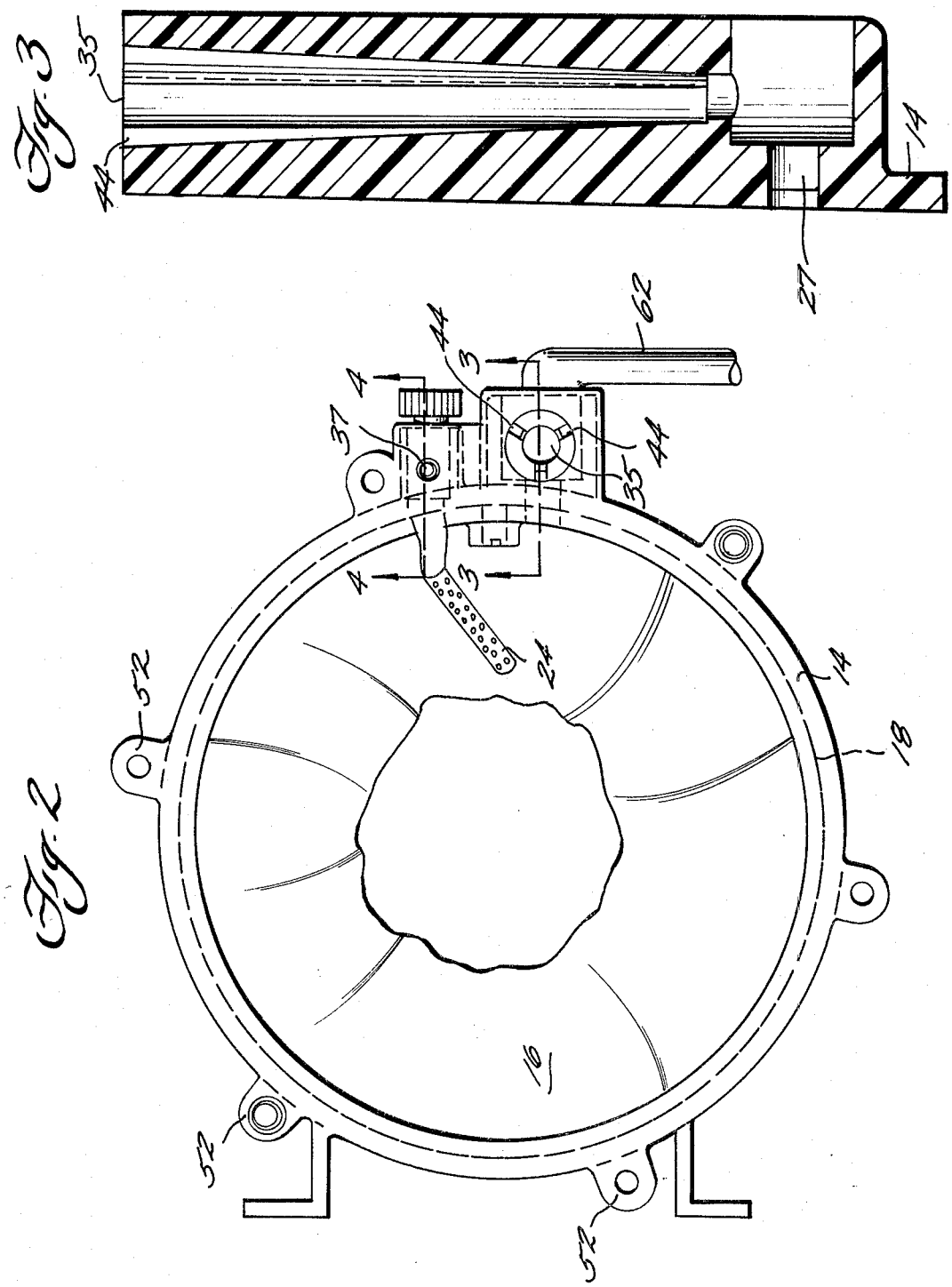

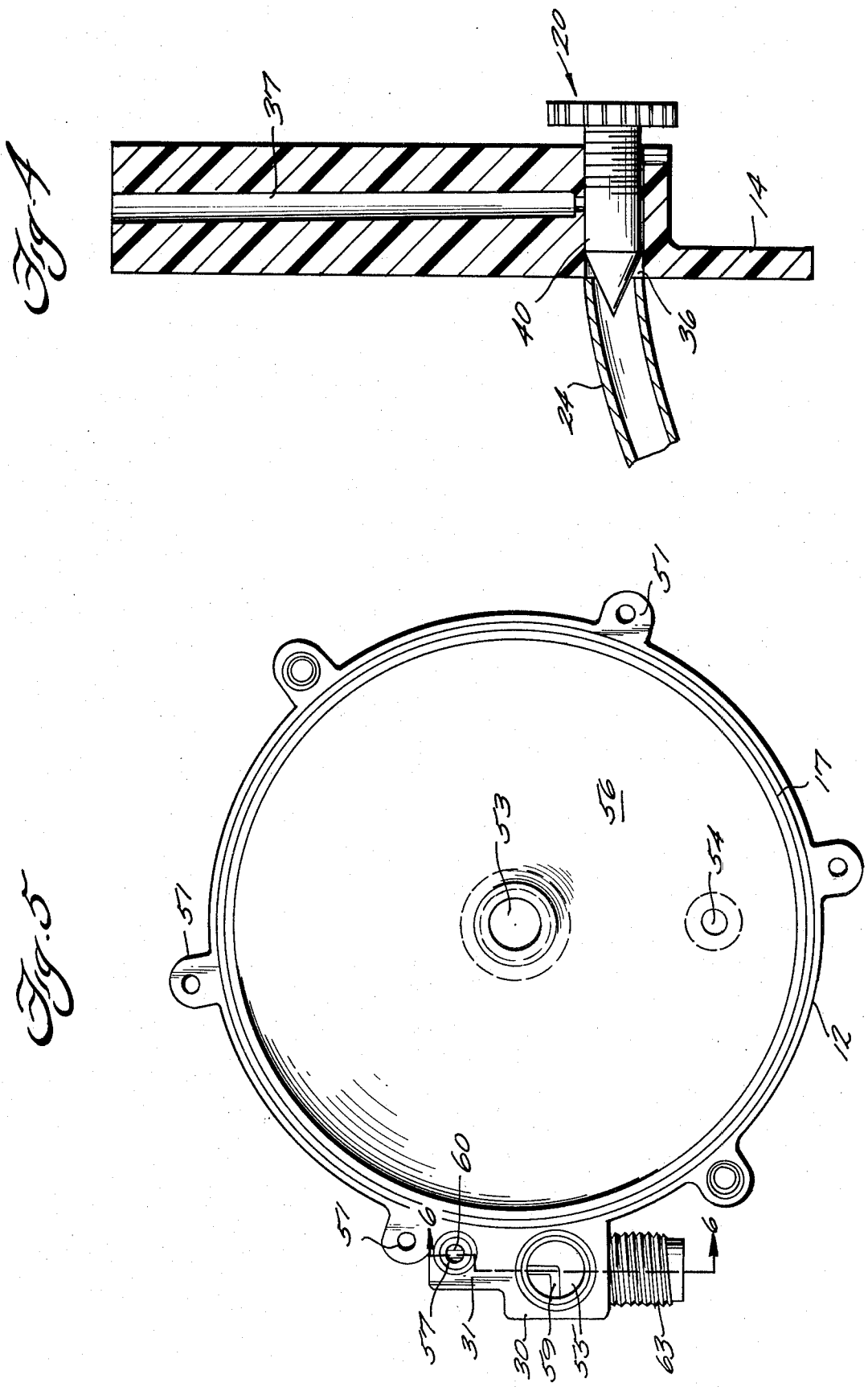

MEDICATOR CONSTRUCTION

BACKGROUND AND SUMMARY OF THE INVENTION

The invention relates to apparatus for metering a medicant into a water flow line, for watering farm animals and the like. There are many different types of medicators now on the market, such as shown in U.S. Pat. No. 3,084,712, No. 3,220,435, and an apparatus called "Medi-Cator" sold by Monoflow International, Inc. of McLean, Va. While such structures are useful for performing a desired function, oftentimes they are expensive to construct, requiring manual assembly of many component parts, a number of accessory structures project from various portions of the apparatus which projections can be damaged during transit and, in any event, are unsightly and cumbersome, and the volume taken up by such prior art structures for a given volume of medicant is often unacceptably high.

According to the present invention, a medicant proportioner has been provided, and a method of construction of same, which has numerous advantages over prior art medicant proportioners. The proportioner according to the present invention is made of plastic by injection molding, the entire structure being capable of formation by injection molding including passageways for the medicant and for directing the water flow to join with the medicant flow, resulting in lower manufacturing costs. Additionally, no awkward extensions from the basic container are provided, resulting in improved appearance and minimizing the possibilities of damage to the medicant proportioner during shipping. For a given volume of medicant, the apparatus according to the present invention has a much lower volume (e.g. about 40% less volume than a "Medi-Cator" device containing the same volume of medicant).

The apparatus according to the present invention includes the conventional components of a flexible bladder, a housing top portion, a housing bottom portion, means for receiving the bladder so that it is disposed between the housing top and bottom portions, a water flow conduit having a first branch thereof extending into the area between the bladder and the housing bottom to apply pressure to squeeze the bladder, and having a second branch passing past the housing; adjustable means for metering medicant between the bladder and the housing top portion into the water flow conduit second branch; and a flexible tube leading from the bladder interior to the medicant metering means. The form that any of such structures may take can be varied widely, any of the forms disclosed in U.S. Pat. No. 3,084,712 and No. 3,220,435, or the form provided in the "Medi-Cator" medicant proportioner, being acceptable. The apparatus according to the present invention is improved in that the housing top and bottom portions are formed of injection molded plastic. Means defining the water flow conduit are formed integrally with the housing bottom portion, and means defining a medicant flow conduit from the flexible tube to the water flow conduit are formed integrally with the housing top and/or bottom portions. Such means defining the water flow conduit and the medicant flow conduit are preferably vertically extending raised portions of the housing top and bottom portions. Preferably, the water flow conduit second branch and the medicant flow conduit are defined by transparent material, the conduits being tapered and defining rotameters.

According to another aspect of the present invention, a container is provided having an integral top plastic housing portion and an integral bottom plastic housing portion. The bottom housing portion has a closed bottom and open top and a closed side, and includes means defining a through-extending opening therein at the bottom thereof; the plurality of fastener receiving members disposed around the periphery of the open top; a first raised portion on the side and having a first bore therein extending through the raised portion and the bottom housing portion side and having a second bore therein extending from the first bore to a point adjacent the open top, the second bore being substantially perpendicular to the first bore; a second raised portion on the housing portion side and having a third bore therein extending through the raised portion and the bottom housing portion side and having a fourth bore extending from the third bore to a point adjacent the open top, the fourth bore being substantially perpendicular to the third bore. The top housing portion has a closed top and an open bottom and a closed side and includes a plurality of fastener receiving members disposed around the periphery of the open bottom for cooperation with the corresponding members on the bottom housing portion; means defining first and second through extending openings in the closed top; a first raised portion on the housing top portion side having a fifth bore therein extending in the same direction as, and for cooperating with, the second bore, and a sixth bore therein extending generally perpendicular to the first and fifth bores and in communication with the fifth bore; and a second raised portion on the housing top portion side and having a seventh bore therein extending in the same direction as, and for cooperating with the fourth bore, and having an eighth bore therein extending in the same direction as and in communication with the sixth bore, and in communication with the seventh bore. Also, according to the present invention, a method of making the container described above is provided, the method comprising injection molding out of plastic both the integral bottom housing portion and the integral top housing portion, which portions may be later assembled together with a flexible elastic bladder received in sealing engagement therebetween.

It is the primary object of the present invention to provide a simplified construction of a medicant proportioner, and a simplified method of constructing the same. This and other objects of the invention will become apparent from an inspection of the detailed description of the invention, and from the appended claims.

BRIEF DESCRIPTION OF THE DRAWINGS

FIG. 2 is a top plan view of the bottom housing portion of the medicant proportioner of FIG. 1, looking in through the open top thereof;

FIGS. 3 and 4 are cross-sectional views of first and second raised portions formed on the bottom housing portion of FIG. 2, taken along lines 3—3 and 4—4 of FIG. 2, respectively;

FIG. 5 is a plan view of the top housing portion of the medicant proportioner of FIG. 1, looking in through the open bottom thereof;

DETAILED DESCRIPTION OF THE DRAWINGS

Figure 1:
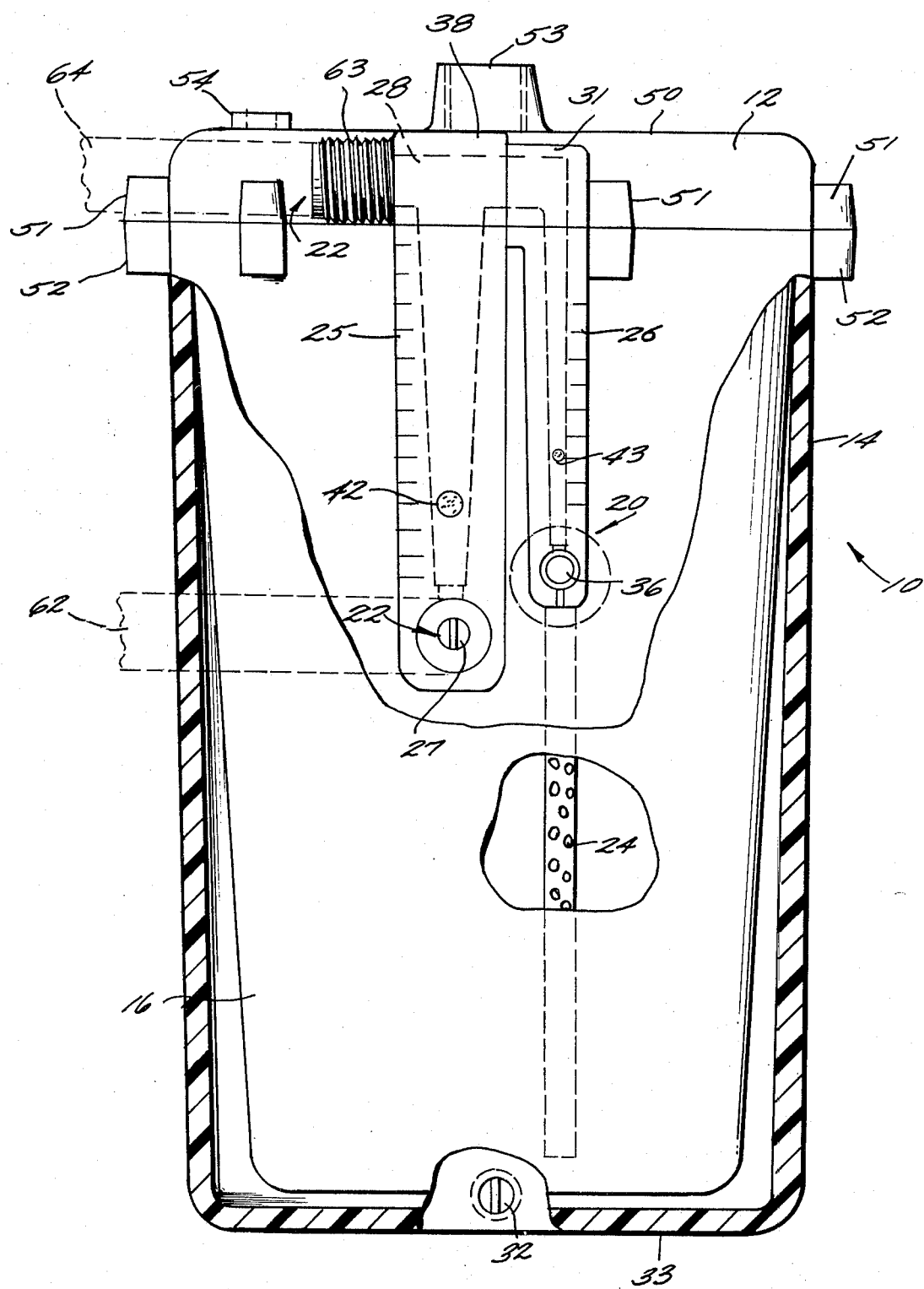
FIG. 1 is a side view partly in cross-section and partly in elevation of an exemplary medicant proportioner according to the present invention.
Figure 7:
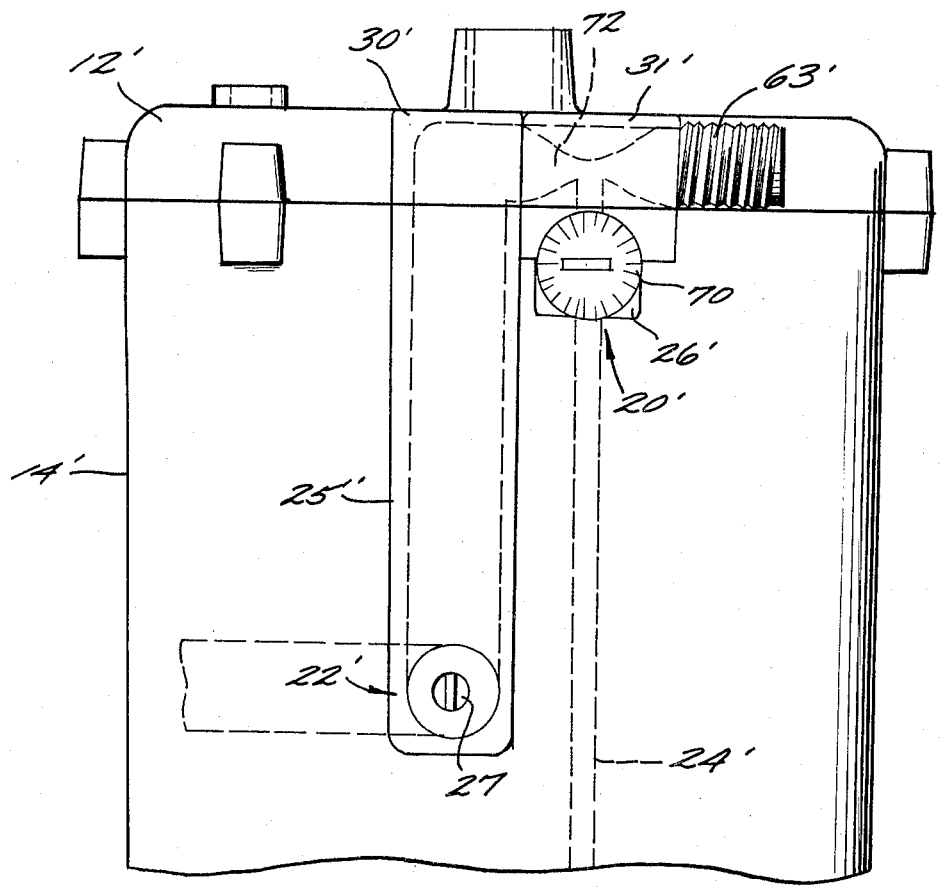
FIG. 7 is a side, partial view of another embodiment of a medicant proportioner according to the present invention.
Figure 6:
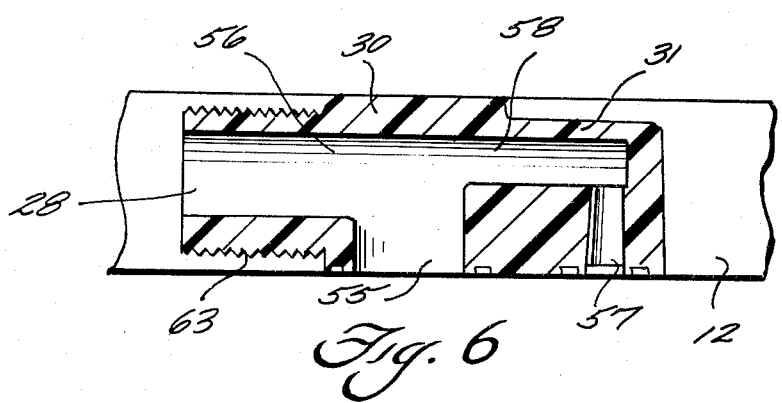
FIG. 6 is a cross-sectional detail view of the raised portions of the top housing portion of FIG. 5, taken along lines 6—6 of FIG. 5.

An exemplary medicant proportioner according to the present invention is illustrated generally at 10 in FIG. 1. The apparatus 10 includes a housing top portion 12, a housing bottom portion 14, a flexible bladder 16 received between the housing top and bottom portions, as by a cooperating groove 17 (see FIG. 5) formed on the housing top portion 12 and a cooperating ridge 18 (see FIG. 2) formed on the housing bottom portion 14; adjustable means 20 for metering medicant from between the bladder 16 and housing top portion 12 into a water flow conduit 22; and a flexible tube 24 leading from the bladder 16 interior to the medicant metering means 20. All such structures are conventional, and may be of a variety of particular constructions. The medicant proportioner illustrated in FIG. 1 has a pair of rotameters associated therewith, as is provided in the "Medi-Cator" medicant proportioner, but alternatively, the details of the components for metering medicant into the water flow may be those such as illustrated in U.S. Pat. No. 3,220,435—as illustrated in FIG. 7—or as provided in U.S. Pat. No. 3,084,712. The disclosure of said U.S. Pat. Nos. 3,084,712 and 3,220,435 are hereby incorporated by reference in the present application.

The improved apparatus according to the present invention is formed by injection molding the top and bottom portions 12, 14 out of plastic, all of the water flow and medicant flow conduits and associated structures being designed so that they can be formed by injection molding, and so that they are integral with the housing top and bottom portions to provide a structure having a compact arrangement with no unsightly and fragile outwardly extending structures. In particular, according to the present invention, a first vertically raised portion 25 is formed on the housing bottom portion 14 and provides means for defining the water flow conduit 22, and a second vertically extending raised portion 26 is formed integrally with the housing bottom portion 14 and provides means defining a medicant flow conduit from the flexible tube 24 to the water flow conduit 22. The water flow conduit 22 includes a first branch 27 thereof which comprises a through-extending opening passing through the wall of the housing portion 14 to extend into the area between the bladder 16 and the housing portion 14, water passing therethrough applying pressure to squeeze the bladder 16; and having a second branch 28 passing past the housing, the medicant flow conduit communicating with the second branch 28. Further, the improvement according to the invention comprises a first raised portion 30 formed integrally with the housing top of portion 12 and for cooperation with the raised portion 15 on the bottom portion 14, and a second raised portion 31 for cooperation with the raised portion 26.

The container 10 according to the present invention has a through-extending opening 32 formed in the side wall of the bottom portion 14, adjacent the closed bottom 33 thereof. The opening 32 is the drain opening for water from between the bladder 16 and the housing bottom portion 14, and a releasable plug or valve is provided in the opening 32 to selectively allow or prevent the draining of water from between the bladder 16 and housing bottom portion 14. The first branch 27 of the water flow conduit 22 in the raised portion 25 comprises a first bore, and the second branch of the water flow conduit 22 associated with the raised portion 25 includes a second bore 35 (see FIG. 2) which communicates with and extends perpendicular to the first bore 27. The second raised portion 26 includes a third bore 36 extending therethrough and through the bottom portion 14 side wall, and includes a fourth bore 37 extending from the third bore to a point adjacent the open top of the housing bottom portion 14, the fourth bore 37 being substantially perpendicular to the third bore 36. The third bore 36 is connected to the flexible tube 24. The metering means 20 may comprise—as illustrated in FIG. 4—a separate valve member 40 rotatable in the third bore 36 for controlling the size of the passageway from the third bore 36 to the fourth bore 37 (e.g. screw threads could be provided in the bore 36 for cooperating with the valve member 40).

In the embodiment of the invention illustrated in FIGS. 1-6, the second and fourth bores 35, 37 are tapered, increasing in cross-sectional area as they extend away from the first and third bores 27, 36, respectively. A weight, such as the balls 42, 43 (see FIG. 1) is provided in each of said bores, the raised portions 25, 26 are transparent, and indicia are provided vertically along the raised portions 25, 26, so that a pair of rotameters are provided. A plurality of flutes 44 may be provided in the bore 35 to provide an inner bore of constant cross-sectional area so that the weight 42 is guided properly during vertical movement thereof in the bore 35.

The top housing portion 12 has a closed top 50, an open bottom and a closed side, and includes a plurality of fastener receiving members 51 disposed around the periphery of the open bottom thereof. These fastener receiving members 51 cooperate with corresponding fastener receiving members 52 formed integrally with the bottom housing portion 14, fasteners passing through the members 51, 52 clamping the portions 12, 14 together in tight, sealing relationship. First and second through-extending openings 53, 54 are provided in the closed top 50, the opening 53 preferably including screw threaded portions for receipt of a plug and the opening 54 for receipt of an air release valve. When a plug adapted to fit in the opening 53 is removed, medicant may be poured into the bladder 16, and the valve adapted to be received by the opening 54 may be operated to allow air to exit from the bladder 16 as medicant is being added thereto.

The top housing portion 12 first raised portion 30 has a fifth bore 55 formed therein, providing part of the water flow conduit second branch 28, the fifth bore 55 extending in the same direction as and for cooperating with the second bore 35 when the top and bottom portions 12, 14 are assembled together. The first raised portion 30 further comprises a sixth bore 56 therein extending generally perpendicular to the first bore 27 and fifth bore 25, and in fluid communication with the fifth bore 55. The second raised portion 31 has a seventh bore 57 therein extending in the same direction as, and for cooperating with the fourth bore 37, and also has an eighth bore 58 formed therein extending in the same direction as and in communication with the sixth bore 56, and in communication with the seventh bore 57. In the embodiment wherein the first and second raised portions 25, 26 provide rotameters, means will be formed in the fifth and seventh bores 55, 57 to prevent the passage of the weights 42, 43 into the bores 55, 57, respectively. Such passageway preventing means are illustrated in FIG. 5, and may comprise an integral angle portion 59 formed in the bore 55, and bar 60 formed in the bore 57.

The first bore 27 is adapted to receive a conduit (such as a hose) 62 from a water source, and the sixth and/or seventh bores 56, 58 are adapted to provide a connector 63 for connection up to another conduit (such as a hose) for providing passage of water to a stock watering system, such as watering troughs or drinkers.

The embodiment of FIG. 7 is substantially identical to the embodiment of FIG. 1 except that the exact way in which the medicant is metered into the water flow is different. In the embodiment of FIG. 7, a needle valve member having a gauge 70 with indicia formed thereon is provided for metering the medicant from the flexible tube 24' to the water flow conduit 22', and in the raised portion 25' a bore of continuous cross-section is provided, and a venturi 72 is provided in the horizontal bore in the second raised portion 31' on the top housing portion 12'. Thus, the metering arrangement of the embodiment of FIG. 7 is identical to that disclosed in U.S. Pat. No. 3,220,435. In this case, the raised housing portions 30', 31' may be formed integral with the raised portions 25', 26' on the housing bottom portion 14' if desired. Also, further alternative metering systems can be provided, such as the differing sized orifice system of U.S. Pat. No. 3,084,712, an orificed plate of predetermined dimensions being provided in each of bores 35 and 37 to provide the metering means 20.

The invention according to the present invention having been described, the method of making and operation thereof will now be set forth:

The top 12 and bottom 14 housing portions are separately formed by injection molding of plastic, preferably transparent plastic. Once the housing portions 12, 14 are formed, the weights 42, 43 are placed in the bores 35, 37, respectively, the valve member 40 is threaded into the bore 36, a removable plug is placed in the opening 32, a removable plug is placed in the opening 53, an air bleed valve is placed in the opening 54, and a bladder 16, which includes a flexible tube 24 in operative engagement with the bore 36, is placed inside the bottom portion 14. Then the top portion 12 is placed on top of the bottom portion 14 with the members 51, 52 thereof cooperating, and the raised portions 30, 25 and 31, 26 in cooperating relationship. The peripheral edges of the bladder 16 are received by the annular depression 17 and annular rib 18, and when the fasteners passing through the members 51, 52 are tightened, the bladder 16 is held in tight, sealing relationship with respect to the housing portions 12, 14.

Once the housing portions 12, 14 are assembled, the in-flow water hose 62 is connected up to the first bore 27, and the outflow water hose 64 is connected up to the connection member 63. The plug in opening 53 is removed and medicant is poured into the interior of the bladder 16. Then water flow through hose 62 is started, part of the water flowing through first bore 27 into the area between the sides and bottom of the bottom housing portion 14 to squeeze the bladder 16, and the rest of the water flowing in bore 37 to elevate the weight 42 depending upon the amount of flow. The valve member 40 is then rotated to allow sufficient medicant flow through the bore 36 into the bore 37 to elevate the weight 43 to the same relative level (as determined by the indicia on the raised portions 25, 26) as the weight 42, and thus the proper amount of medicant passes through the bores 37, 57, and 58 into the water flowing through bores 55 and 56, and the fluid exiting from the container 10 and the hose 64 is appropriate for watering stock.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for metering a medicant into a water flow line and including: a flexible bladder; a housing top portion; a housing bottom portion; means for receiving said bladder so that it is disposed between said housing top and bottom portions; a water flow conduit having a first branch thereof extending into the area between said bladder and said housing bottom portion to apply pressure to squeeze said bladder, and including means extending said first branch to a second branch in said housing top portion; a medicator flow conduit including an adjustable means for metering medicant from between said bladder and said water flow conduit second branch; and a flexible tube extending from said bladder interior to said medicant metering means; wherein the improvement comprises:

said housing top and bottom portions are formed of injection molded plastic; means defining said water flow conduit first branch and means extending said first branch are formed integrally with said housing bottom portion; and means defining said medicant flow conduit from said flexible tube to said second branch being formed integrally within said housing bottom portion; means defining said second branch being formed integrally within said housing top portion.

2. Apparatus as recited in claim 1 wherein said means extending said water flow conduit is transparent and tapered and includes a weight therein to thereby define a rotameter, and wherein said means defining said medicant flow conduit from said flexible tube to said water flow conduit second branch is transparent and tapered and includes a weight therein to thereby define a rotameter, and wherein communicating portions of said second branch and said medicant flow conduit are formed in said housing top portion.

3. Apparatus as recited in claim 2 wherein said communicating portions of said second branch and said medicant flow conduit formed in said housing top portion have integrally formed means associated therewith for preventing movement of the weights disposed in said tapered conduits therepast.

4. Apparatus as recited in claim 1 wherein said means extending said first branch and said means defining said medicant flow conduit include vertically extending raised portions of said housing bottom portion.

5. A container having an integral top plastic housing portion and an integral bottom plastic housing portion,
said bottom housing portion having a closed bottom and open top and a closed side and including: means defining a through-extending opening therein at the bottom thereof; a plurality of fastener receiving members disposed around the periphery of said open top; a first raised portion on said side having a first bore therein extending through said bottom housing portion side into said container and having a second bore therein extending from said first bore to a point adjacent said open top, said second bore being substantially perpendicular to said first bore; a second raised portion on said side having a third bore therein extending through said bottom housing portion side into said container and having a fourth bore therein extending from said third bore to a point adjacent said open top, said fourth bore being substantially perpendicular to said third bore; and said top housing portion having a closed top and an open bottom and a closed side and including: a plurality of fastener receiving members disposed around the periphery of said open bottom for cooperation with said members on said bottom housing portion; and means defining first and second through-extending openings in said closed top.

6. A container as recited in claim 5 wherein said top housing portion further comprises: a first portion having a fifth bore therein extending in the same direction as, and for cooperating with, said second bore, and a sixth bore therein extending generally perpendicular to said first and fifth bores and in communication with said fifth bore; and a second portion having a seventh bore therein extending in the same direction as, and for cooperating with said fourth bore, and having an eighth bore therein extending in the same direction as and in communication with said sixth bore, and in communication with said seventh bore.

7. A container as recited in claim 6 wherein said second bore is tapered, increasing in cross-sectional area from said first bore to said fifth bore; and wherein said fourth bore is tapered, increasing in cross-sectional area from said third bore to said seventh bore; and further comprising means formed in said fifth and seventh bores to prevent the passage of a weight thereinto from said second and fourth bores, while allowing passage of liquid thereinto.

8. A container as recited in claim 7 wherein said bottom portion first raised portion includes a plurality of flutes extending into said second bore to provide an inner bore having substantially constant cross-sectional area.

9. A container as recited in claim 5 further comprising surface means formed around the periphery of said bottom portion open top, and said top portion open bottom for receipt of a flexible bladder to facilitate clamping of said flexible bladder between said top and bottom housing portions in liquid-tight relationship with respect thereto.

10. A container as recited in claim 5 further comprising a separate valve member rotatable in said third bore for controlling the size of the passageway from said third bore to said fourth bore.

* * * * *